United States Patent [19]
Horvat

[11] 3,832,003
[45] Aug. 27, 1974

[54] ENERGY ABSORBING SEAT ASSEMBLY
[75] Inventor: Rudolph M. Horvat, Allen Park, Mich.
[73] Assignee: The Ford Motor Company, Dearborn, Mich.
[22] Filed: Aug. 6, 1973
[21] Appl. No.: 383,945

[52] U.S. Cl................. 297/216, 297/379, 297/386, 296/65 A
[51] Int. Cl............................................. B60r 21/10
[58] Field of Search ........... 297/454, 216, 378, 379, 297/380, 381, 386; 296/65 A

[56] References Cited
UNITED STATES PATENTS
2,401,748  6/1946  Dillon ................................ 297/216
2,636,552  4/1953  Long ................................. 297/216
3,321,242  5/1967  Ferrara ........................... 297/379 X
3,501,200  3/1970  Ohta ................................. 297/454
3,761,127  9/1973  Giese et al .......................... 297/386

FOREIGN PATENTS OR APPLICATIONS
1,630,891  3/1971  Germany ........................ 296/65 A Primary Examiner—James T. McCall
Attorney, Agent, or Firm—Keith L. Zerschling; John J. Roethel

[57] ABSTRACT

A vehicle seat assembly includes a generally horizontal seat structure and an upstanding backrest structure pivotally mounted on the seat structure for tiltable movement forwardly over the latter. An energy absorbing device mounted on one of the structures is releasably coupled through a latch device means to the other of the structures. The energy absorbing device is operative, when coupled through the latch device means to the other of the structures, to control forward tilting movement of the backrest structure in response to high external forces acting on the latter.

4 Claims, 2 Drawing Figures

PATENTED AUG 27 1974          3,832,003

ENERGY ABSORBING SEAT ASSEMBLY

BACKGROUND OF THE INVENTION

Most two-door vehicles include seat assemblies having forwardly tiltable seat back structures. The purpose of the tiltable seat back is to provide for enlargement of the space between the seat back and the adjacent body pillar to permit easier ingress to and egress from the compartment space to the rear of the front seat. The freedom for foward tilting movement is obtained by release of a latch mechanism normally rigidly coupling the backrest structure to the seat structure of the seat assembly.

As disclosed in prior art patents including U.S. Pat. No. 3,501,200 relating to "Seat Reinforcing Plate Construction," issued to S. Ohta on Mar. 17, 1970, it is desirable that the rigid seat structure collapse partially during impact in order to absorb any shock forces which are produced and, thereby, prevent transmission of the impact shock forces to the occupant of the seat. The Ohta disclosure is primarily concerned with the absorption of shock forces causing rearward pivotal displacement of the backrest structure. No provision is made for latch release of the backrest structure, thereby limiting use of the energy absorbing seat to four-door or two-passenger vehicles.

It is also desirable to have energy absorption of shock forces tending to swing the backrest forwardly upon impact. This could occur from the weight of the backrest structure itself, by the force applied by a rear seat occupant being thrown forwardly into the backrest structure, and by forces applied to the seat occupant through a passenger restraint system anchored to or passing over the seat backrest structure.

It is an object of the present invention to provide a seat assembly having energy absorbing means controlling forward collapse of the seat backrest and including latch means for releasing the backrest for forwardly tilting movement when desired.

SUMMARY OF THE INVENTION

The present invention relates to a vehicle seat assembly having a generally horizontal seat structure and an upstanding backrest structure. A pivot means pivotally supports the backrest structure on the seat structure for tiltable movement forwardly over the seat structure. The seat assembly includes a latch device means pivotally mounted thereon for releasably latching the seat backrest structure to the seat structure.

The improvement comprises an energy absorbing device mounted on one of the structures, preferably the seat structure, releasably coupled through the latch device means to the other of the structures, preferably the backrest structure. The energy absorbing device is operative when coupled by the latch device means to the other of the structures to control forward tilting movement of the backrest structure caused by external forces acting on the latter.

In its preferred form, the energy absorbing device comprises an elastomeric member mounted on the frame member of the seat structure and a ram member bonded at one end to the elastomeric member and at its other end having a latch device engageable part. The elastomeric member is adapted to resist in shear the forces applied to the ram by a latch device means in response to the external forces acting on the backrest structure.

Preferably, the latch device means is movable by an operating means out of engagement with the latch device engageable part of the ram member to permit unrestrained forward tilting movement of the backrest structure when desired.

DESCRIPTION OF THE DRAWING

Further features and advantages of the present invention will be made more apparent as this description proceeds, reference being had to the accompanying drawing, wherein.

DETAILED DESCRIPTION OF THE INVENTION

Figure 1:
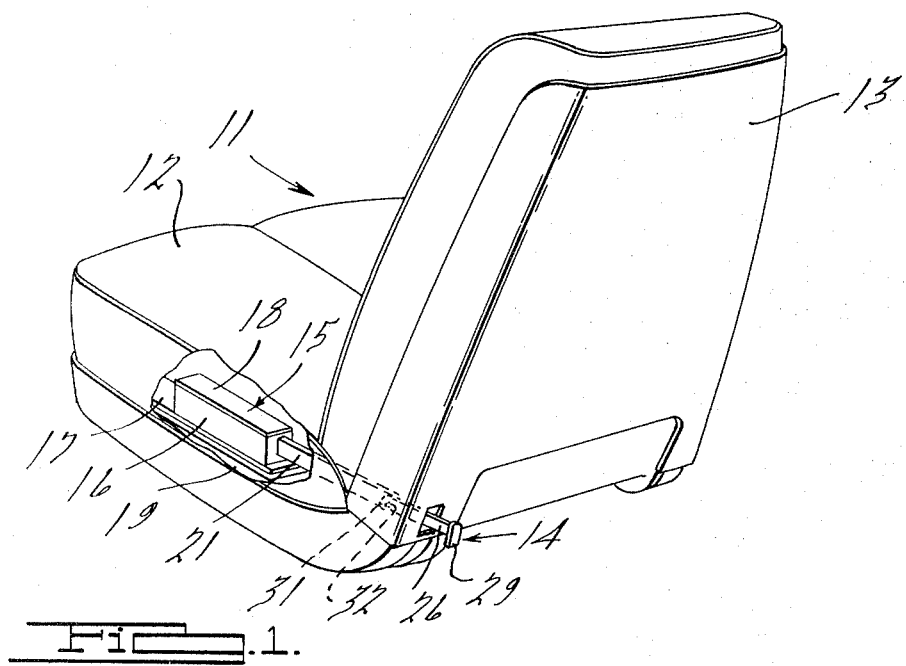
FIG. 1 shows a seat assembly including an energy absorbing device embodying the present invention.

FIG. 1 illustrates a vehicle seat assembly, generally designated 11, as viewed from its left rear corner. The seat assembly 11 comprises a substantially horizontal seat or cushion structure 12 and a normally upstanding backrest structure 13 which is pivotally supported on the seat cushion structure. A latch device means, generally designated 14, releasably holds the backrest structure 13 against forward tilting movement over the seat cushion structure 12.

The present invention embodies an energy absorbing device, generally designated 15, for controlling the forward tiltable movement of the backrest structure when in latched condition but being subjected to high external forces tending to tilt the backrest forwardly over the seat structure. Such forces may occur upon a sudden stoppage of the vehicle, either upon sudden application of the vehicle brakes or upon frontal impact with an object or another vehicle. Under any such circumstance, the backrest would tend to be rotated forwardly by its own weight above its pivot axis, or by the impact of a rear seat occupant being thrown forwardly into the backrest structure, or by forces applied by the seat occupant through a passenger restraint system anchored to or passing over the seat backrest structure.

In its preferred form, the energy absorbing device comprises an elastomeric block 16 bonded to a metal base plate 17 and a cap plate 18. The elastomeric block preferably is a natural rubber material. The base plate 17 is welded or otherwise secured to a frame member 19 of the seat structure 12.

Extending through the elastomeric block 16 is an elongated link or ram 21, the longitudinal axis of which parallels the plane of the base plate 17.

At its rear end the frame member 19 has an upstanding leg portion 22 which has interconnected engagement with a depending portion 23 of the frame structure 24 of the backrest structure 14. The backrest frame structure 24 is pivotally supported on the leg portion 22 of the seat structure frame 19 by a pivot pin 25. It will be understood that a similar pivotal support system exists on the opposite side of the seat assembly 11.

Because the depending leg portion 23 extends for some distance below the pivot axis defined by the pivot pin 25, the seat backrest is inherently substantially restrained against rearward tilting movement from its normal upright position shown in FIG. 1. If a rearwardly directed force of sufficient magnitude is applied to the backrest structure, such as the force that might be exerted by a seat occupant upon the vehicle being rammed from the rear, to force the backrest rearwardly the deformation of the frame structure would result in energy absorption.

The present invention is concerned with forces causing the backrest structure to be forwardly tilted. As discussed above, such forces would be those as occur when the vehicle impacts an object or when the vehicle brakes are suddenly applied. Under such circumstances, a rear seat occupant might be thrown against the backrest tending to tilt the same forwardly, or if the shoulder harness segment of a seat belt system is anchored to the seat back, the vehicle occupant would pull the backrest structure forwardly. Such forward tilting movement is yieldably resisted by the energy absorbing device 15 embodying the present invention which is coupled to the seat backrest frame structure 24 by the latch device 14. Yielding resistance or controlled collapse is preferable to a rigid resistance under which the body of the seat occupant must absorb the high forces.

The latch device 14 comprises a lever 26 pivoted intermediate its ends on a pivot pin 27 which is located below and parallel to the backrest pivot pin 25. The lever 26 extends in a fore and aft direction and at its rear end 28 carries an operating handle 29. At its front end the lever has a hook 31 which is adapted to engage a pin 32 projecting from the end 33 of the link or ram 21.

Figure 2:
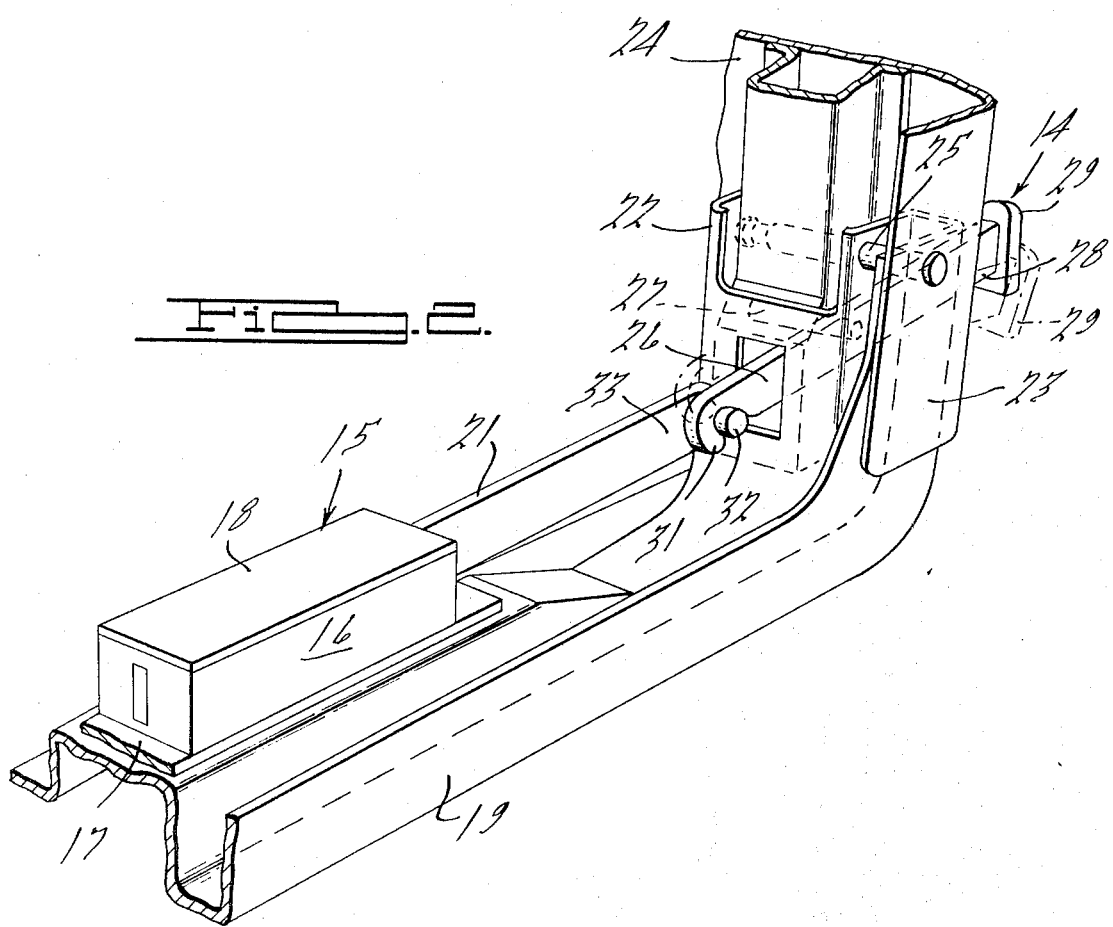
FIG. 2 is an enlarged fragmentary view of the seat assembly particularly emphasizing the features of the energy absorbing device in relationship to the latch mechanism mounted on the seat back structure.

In operation, any force applied to the seat backrest structure tending to tilt the latter forwardly, i.e., in a counterclockwise direction as viewed in the drawing, will be transmitted through the latch lever 26 to the ram 21. This will result in energy absorbing shear stresses being placed on the elastomeric block 16. The elastomeric block 16 thus will yieldingly resist movement of the ram from left to right and movement of the seat backrest structure in the counterclockwise direction. Upon termination of the displacing force, the seat backrest structure will be restored to its normal upright position as the elastomeric block 16 restores itself and the ram 21 to the normal condition shown in FIG. 2.

The release of the backrest structure to increase the access passageway to its rear is easily achieved. It is only necessary to depress the handle 29 of the latch device 14 to disengage the lever hook 31 from the pin 32. The backrest structure then is freely forwardly pivotal about its pivot axis, i.e., the axis of pivot pin 25 and its associated pivot pin (not shown) on the opposite side of the seat assembly 11.

It is to be understood this invention is not limited to the exact construction illustrated and described above, but that various changes and modifications may be made without departing from the spirit and scope of the invention as defined by the following claims.

I claim:

1. A vehicle seat assembly having a generally horizontal seat structure and an upstanding backrest structure,
    pivot means pivotally supporting the backrest structure on the seat structure for tiltable movement forwardly over the seat structure,
    and latch device means pivotally mounted on the seat assembly,
    wherein the improvement comprises:
    an energy absorbing device mounted on one of the structures and releasably coupled through the latch device means to the other of the structures,
    the energy absorbing device being operative when coupled through the latch device means to the other of the structures to control forward tilting movement of the backrest structure upon high external forces acting on the latter.

2. A vehicle seat assembly according to claim 1, in which:
    the energy absorbing device is anchored to a frame member of the seat structure,
    and the latch device is carried by the backrest structure.

3. A vehicle seat assembly according to claim 2, in which:
    the energy absorbing device comprises an elastomeric member mounted on the frame member,
    and a ram member bonded at one end to the elastomeric member and at its other end having a latch device engageable part,
    the elastomeric member resisting in shear the forces applied to the ram by the latch device means in response to the external forces acting on the backrest structure.

4. A vehicle seat assembly according to claim 3, in which:
    the latch device means is movable by an operating means out of engagement with the latch device engageable part of the ram member to permit unrestrained forward tilting movement of the backrest structure.

* * * * *